United States Patent
Pepka

(10) Patent No.: US 8,701,462 B2
(45) Date of Patent: Apr. 22, 2014

(54) SHIM STACK TESTING APPARATUS AND METHOD

(75) Inventor: Charles F. Pepka, Renton, WA (US)

(73) Assignee: Renton Coil Spring Company, Renton, WA (US)

( * ) Notice: Subject to any disclaimer, the term of this patent is extended or adjusted under 35 U.S.C. 154(b) by 363 days.

(21) Appl. No.: 13/229,390

(22) Filed: Sep. 9, 2011

(65) Prior Publication Data

US 2013/0061651 A1    Mar. 14, 2013

(51) Int. Cl.
*G01M 17/10* (2006.01)
(52) U.S. Cl.
USPC ........................................ 73/11.04; 73/11.09
(58) Field of Classification Search
USPC ............................................. 73/11.04–11.09
See application file for complete search history.

(56) References Cited

U.S. PATENT DOCUMENTS

2002/0095979 A1* 7/2002 Shirato et al. ................ 73/118.1
2009/0255098 A1* 10/2009 Andberg et al. ................ 24/530

* cited by examiner

*Primary Examiner* — Lisa Caputo
*Assistant Examiner* — Jonathan Dunlap
(74) *Attorney, Agent, or Firm* — Lowe Graham Jones PLLC

(57) ABSTRACT

A shim stack testing apparatus and method of determining a stiffness of the shim stick may be employed to assemble a shim stack kit. The apparatus includes a testing jig that receives either a compression or rebound shim stack. The testing jig may be used with a variety of testing machines capable of determining force versus deflection. The test jig includes a simulated piston rod coupled to a simulated piston valve having apertures. The shim stack being tested may be coupled to the piston at a selected location and then deflected by a pre-determined amount by a loading fixture having elongated prongs. Once the pre-determined deflection is achieved, a corresponding force is identified and then an overall stiffness value for the shim stack is obtained. Tested shim stacks may be assembled into kits with each having an identified stiffness that may be compared to a baseline stiffness value.

20 Claims, 3 Drawing Sheets

SHIM STACK TESTING APPARATUS AND METHOD

FIELD OF THE INVENTION

This invention relates generally to a shim stack testing apparatus and shim stack testing method, and more specifically to a testing jig for measuring a shim stack stiffness.

BACKGROUND OF THE INVENTION

Shock absorbers are widely used in various types of equipment and on a variety of vehicles, such as, but not limited to, vehicle suspension systems for traveling over land. Generally, it is desirable to absorb impacts with spring systems between wheel assemblies and the main chassis of the vehicle, while providing for both compression and rebound damping to avoid excessive bounce and maintain good contact and control with the ground. However, it is also desirable to have a suspension stiff enough that it does not "bottom out" (i.e., reach the end of its compression travel) upon low-frequency high-amplitude bumps or jumps. Setting up the spring rates and damping control to deal with such large suspension hits may cause the suspension to be harsh over high-frequency low-amplitude terrain features.

Although it is desirable to develop suspension systems with a wide damping range, that preferably does not bottom out, and has an adequate stiffness to maintain traction, the process of tuning a shock absorber is regarded by many as a "black art." In brief, the tuning process generally involves changing the shims of the compression and rebound shim stacks to create the right "feel" of the suspension system, for example increased or decreased stiffness in order to obtain a desired balance between stability and response versus comfort and traction. Those skilled in the art of tuning suspensions often rely on years of experience and an uncanny ability to "feel" or estimate the appropriate amount of stiffness for a shock absorber depending on a variety of variables, vehicle and rider weight, vehicle driving style, road conditions, rider input and other factors. It is understood that compression damping changes may be used to influence the vehicle's stability and response, while rebound damping changes may be used to influence comfort and traction.

By way of example, one method for tuning a shock absorber suggests the following steps, as follows: (1) understand the function of the shock absorber and its affect on the handling of the vehicle; (2) keep notes for each tuning step; (3) make only an incremental adjustment and then test; (4) repeat as necessary; (5) go back to the shim stack starting configuration and double check to be sure; (6) monitor any change in conditions like tire pressure, temperature, etc. This is why shock absorber tuning is considered to be a black art.

SUMMARY OF THE INVENTION

The present invention relates to a shim stack testing apparatus and method of determining a stiffness of the shim stick, preferably to assemble a shim stack kit. More specifically and in one embodiment, the present invention relates to a shim stack testing apparatus having a test jig that receives either a compression or rebound shim stack assembly. The test jig may be used with a variety of testing machines capable of determining force versus deflection or vice-versa. In one embodiment, the test jig includes a simulated piston rod coupled to a simulated piston valve having a plurality of openings. The shim stack to be tested may be coupled to the piston at a selected location. Correspondingly, the method provides a repeatable and accurate to measure a pre-determined amount of shim stack deflection while recording the force necessary to achieve the pre-determined deflection.

In accordance with an aspect of the invention, a shim stack testing apparatus includes a base assembly having a base platform and at least two posts extending from the base platform; a loading fixture having a plate member coupled to at least two collars arranged on the plate member to collinearly align with and be slidably received by the two posts of the base assembly; a plurality of elongated, load-transfer prongs coupled to and extending from the plate member; and a shock absorber test assembly having a testing piston rod and a testing valve mechanism, the piston rod coupled to the base platform and configured with a shoulder surface for supporting a shim stack, the testing valve mechanism having corresponding openings to receive the load-transfer prongs, wherein the valve mechanism is coupled to the piston rod and oriented so the load-transfer prongs contact and deflect the shim stack.

In accordance with another aspect of the invention, a method of testing a shim stack for a shock absorber includes the steps of (1) positioning a shim stack onto a testing jig; (2) moving load-transfer prongs through openings in a valve mechanism such that the rods contactingly engage a first shim of the shim stack; (3) applying a force to deflect the shim stack by a pre-determined amount; (4) acquiring a value of the force that corresponds to the pre-determined amount of shim stack deflection; and (5) recording a stiffness of the shim stack.

In accordance with yet another aspect of the invention, a shim stack kit includes at least two compression shim stacks with each stack having a combination of selected shims, wherein the combination of selected shims were previously tested and identified with a stated overall compression shim stack stiffness; and at least two rebound shim stacks having with each stack having a combination of selected shims, wherein the combination of selected shims were previously tested and identified with a stated overall rebound shim stack stiffness, wherein the shim stacks were previously tested using a simulated piston-valve test fixture in which the shim stack was deflected by a pre-determined amount to determine a corresponding force.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

As will be described in further detail below, at least one embodiment of the invention includes a shim stack testing apparatus and method that quantifies an overall stiffness value for a shim stack (i.e., any combination of individual shims) and may identify how each shim stack stiffness relates to a nominal or baseline stiffness value. To that end, the shim stacks or individual shims, which can be selectively assembled, may be arranged into a kit in which the shim stacks may be arranged from a low (i.e., soft) stiffness to a high (i.e., firm) stiffness.

Figure 1:
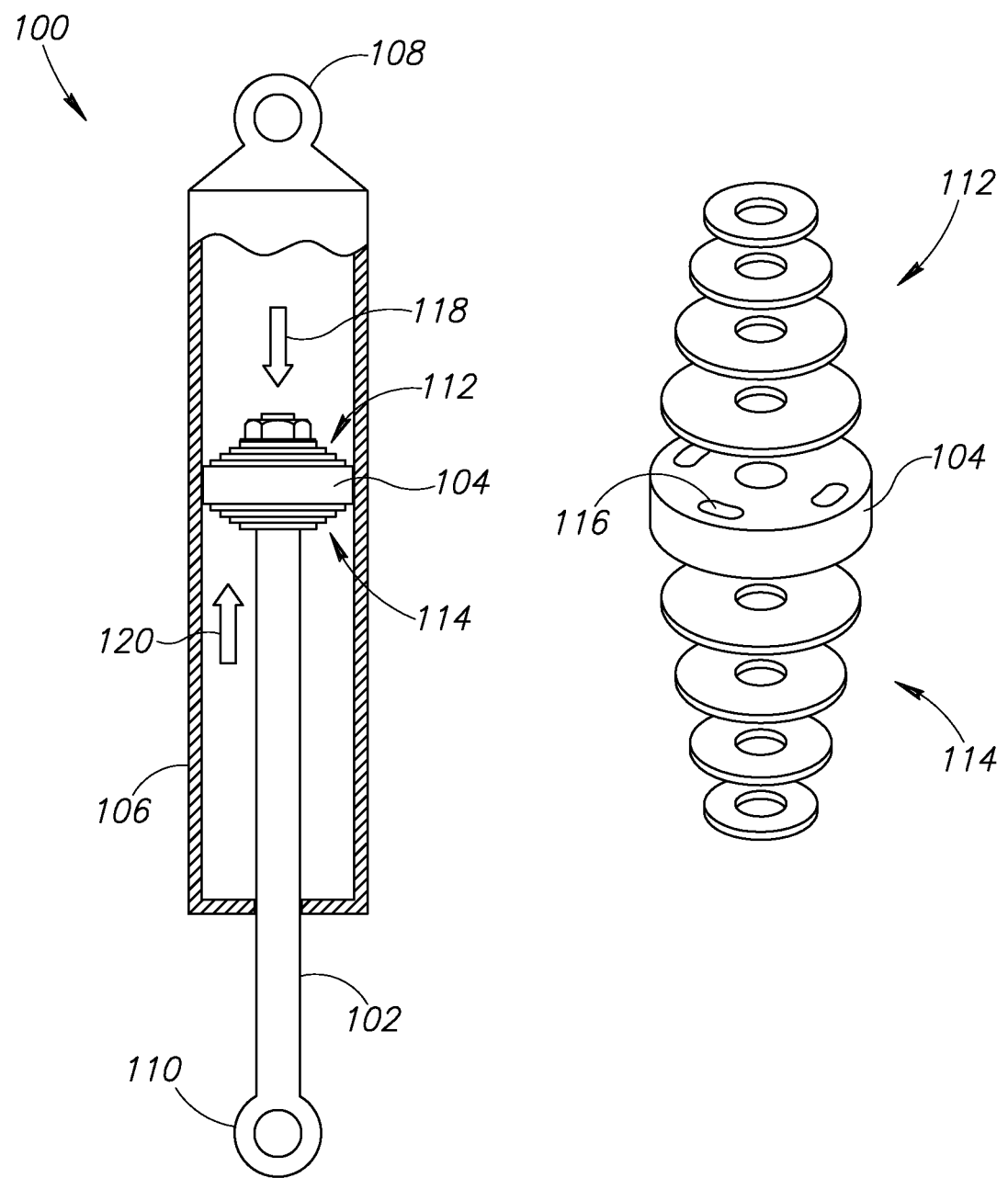
FIG. 1 is a schematic, exploded view of a shock absorber having compression and rebound shim stacks achieved through testing according to an embodiment of the present invention.

FIG. 1 schematically shows a shock absorber 100 having a piston rod 102 coupled to a piston valve 104 and both located in a cylinder 106. The cylinder 106 includes a cylinder mount 108 that may be secured to one portion of a vehicle (not shown), such as the swing arm of a motorcycle. The shock absorber 100 further includes a rod mount 110 that may be secured to another portion of the vehicle, such as the chassis. The arrangement may be reversed. The shock absorber 100 may be used on a vehicle or other mechanism that includes relative movement, such as between the chassis and the ground. In addition, the shock absorber 100 includes a rebound shim stack 112 located above the valve 104 and a compression shim stack 114 located underneath the valve 104. The terms "above" and "underneath" are used for reference purposes only with respect to the illustrated drawings and it is understood that the shock absorber 100 may be spatially oriented in a variety of ways. The terms "compression" and "rebound" are industry terms that generally identify the state of the shock absorber 100 when the piston rod 102 and valve 104 are moving. The valve 104 includes apertures 116 arranged to permit hydraulic fluid or an equivalent fluid (not shown) to flow in a compression direction 118 or a rebound direction 120. When the shim stacks are under pressure they deflect to permit flow of the hydraulic fluid in the corresponding direction.

One purpose of the shock absorber 100 is to identify a stiffness value that corresponds to each shim stack 112, 114 using a testing jig and testing method, as described below. By testing various combinations of shims arranged into, or that could be selectively arranged into, the shim stack 112 or 114, one objective of the present invention is to reduce or minimize the amount of "black art" needed to sufficiently tune the shock absorber 100.

Figure 2A:
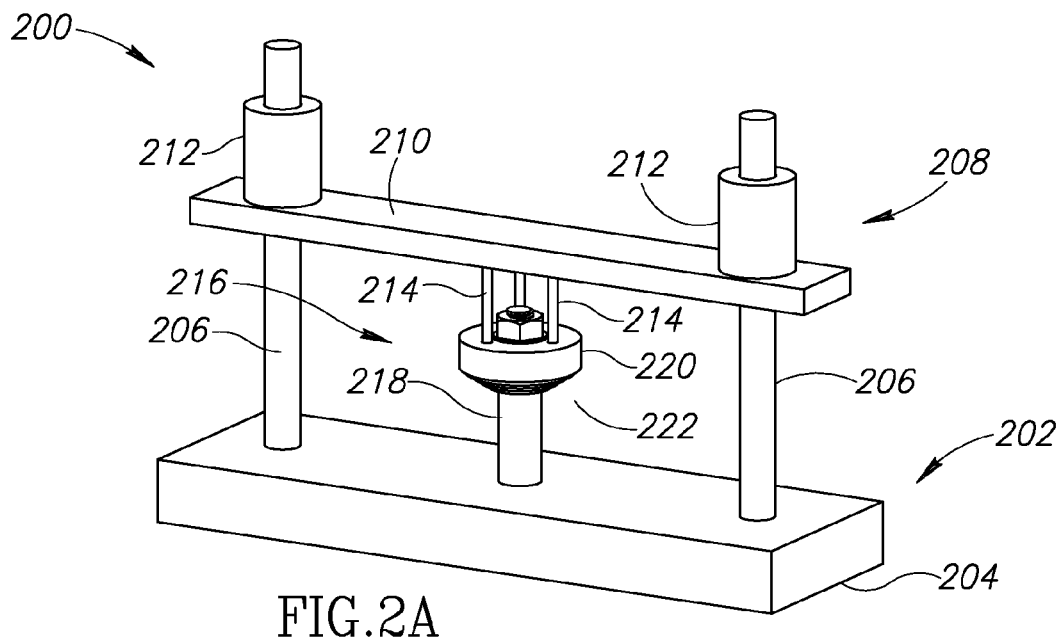
FIG. 2A is perspective view of a testing apparatus or jig for obtaining an overall stiffness value of a shim stack according to an embodiment of the present invention.

FIG. 2A shows a testing apparatus or jig 200 that may be used in conjunction with a testing machine to determine a stiffness value of a shim stack. By way of example, the testing machine may take the form of an INSTRON® testing machine with the capacity to evaluate the mechanical properties of materials and components using tension, compression, flexure, fatigue, impact, torsion and hardness tests. The jig 200 includes a base assembly 202 with a base platform 204 and at least two posts 206 extending from the base platform. A loading fixture 208 includes a plate member 210 coupled to at least two collars 212 arranged on the plate member 210 to collinearly align with and slide onto the two posts 206 of the base assembly 202. Elongated, load-transfer pins or prongs 214, also called projection pins, extend from the plate member 210. In the illustrated embodiment three load-transfer prongs 214 extend from the plate member 210, however there may be fewer or more prongs 214.

Mounted onto the base assembly 202 is a shock absorber test assembly 216 having a testing piston rod 218 and a testing valve mechanism 220. A shim stack 222 is positioned or otherwise received onto the testing piston rod 218. The shim stack 222 to be tested may take the form of a compression or rebound stack and may be assembled with a variety of shims. By way of example, the shim stack may include shims that each have a different outer diameter, one or more of the shims may have different thicknesses or be made from a different material, one or more of the shims may be shaped slightly different than an adjacent shim, or some combination thereof.

Figure 2B:
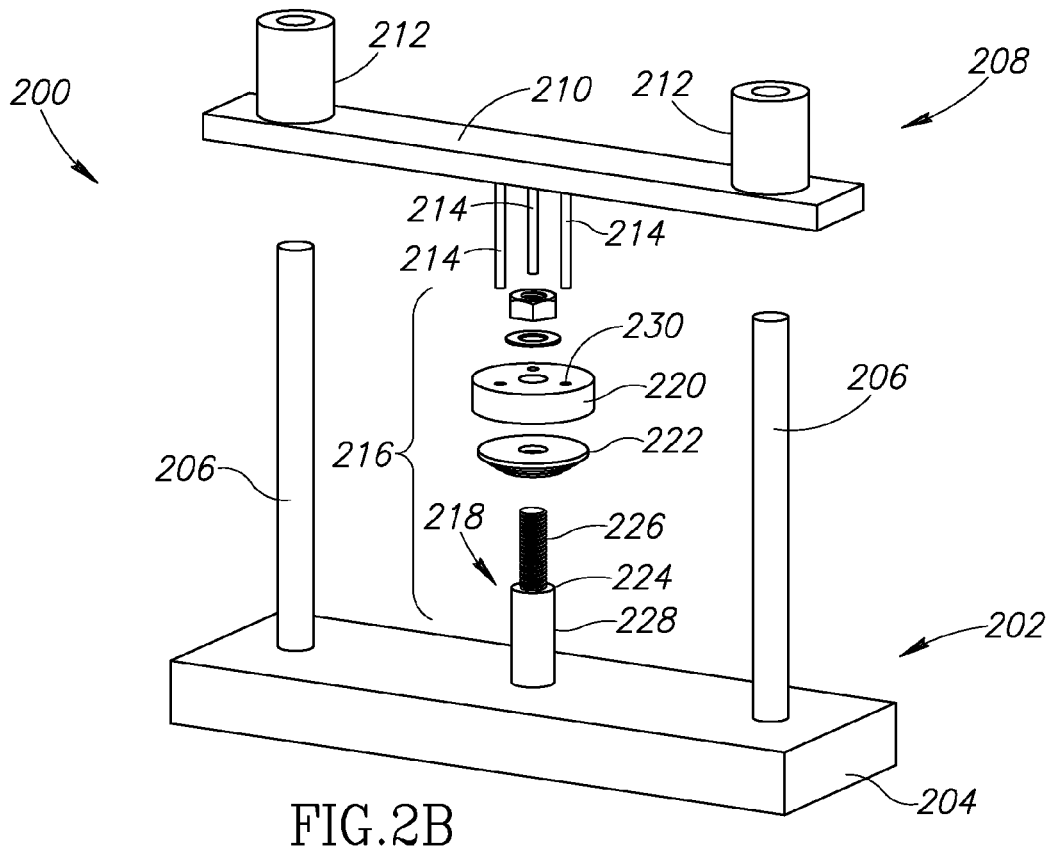
FIG. 2B is an exploded, perspective view of the testing apparatus or jig of FIG. 2A.

As best illustrated in FIG. 2B, the testing piston rod 218 may be coupled to the base platform 204 and configured with a shoulder 224 for supporting the shim stack 222, an upper threaded portion 226 located above the shoulder 224, and a non-threaded, lower portion 228 located below the shoulder 224 according to the illustrated embodiment. By way of example, at least the lower portion 228 of the testing piston rod 218 may simulate the dimensions of the piston rod 102 of the shock absorber 100. The testing valve mechanism 220 includes apertures 230 that may be aligned to receive the prongs 214 during testing.

To test the shim stack 222, it is placed on the shoulder 224 of the rod 218 and then secured in situ by the valve mechanism 220, which may be threaded or otherwise connected to the piston rod 218. The loading fixture 208 is aligned and slid onto the base assembly 202 such that the collars 212 slideably receive the posts 206 and the prongs 214 enter the apertures 230 of the valve mechanism 220 and make contact with the shim stack 222. The testing machine incrementally steps or moves the loading fixture 208 downward to deflect the shim stack 222 by a pre-determined distance, which may preferably be measured using optical techniques. Alternatively, the testing machine may incrementally apply pre-determined loads (i.e., forces) to the shim stack 222 until a total, pre-determined amount of load has been applied to the shim stack. At that time, the deflection of the shim stack 222 may be measured in view of the known, applied load. It is generally appreciated that loading of the shim stack 222 should be incremental to avoid any undesired dynamic loading of the shim stack, but nevertheless the loading of the shim stack 222 may be applied with a single load if so desired.

Once the shim stack 222 has deflected to the pre-determined distance or the pre-determined load has been applied, then the testing machine identifies a corresponding force or deflection, respectively. The values of the deflection and the force may be arranged to provide an overall stiffness for the shim stack 222. In turn, this overall stiffness may be compared to a nominal or baseline stiffness so one may easily determine whether a selected shim stack 222 is softer or firmer than the baseline. While the combinations of shims that make up a particular shim stack may be theoretically much greater than the number of shim stacks available in a kit, one possible advantage of the present invention is that an end-user may create custom shim stacks and have a much better idea of whether their custom stack would be softer or firmer than the baseline. Alternatively, assembled shim stacks each having known stiffness values acquired through testing may be made available in a kit. It is appreciated that a compression shim stack may have a different stiffness than a rebound shim stack in the same shock absorber.

Figure 3:
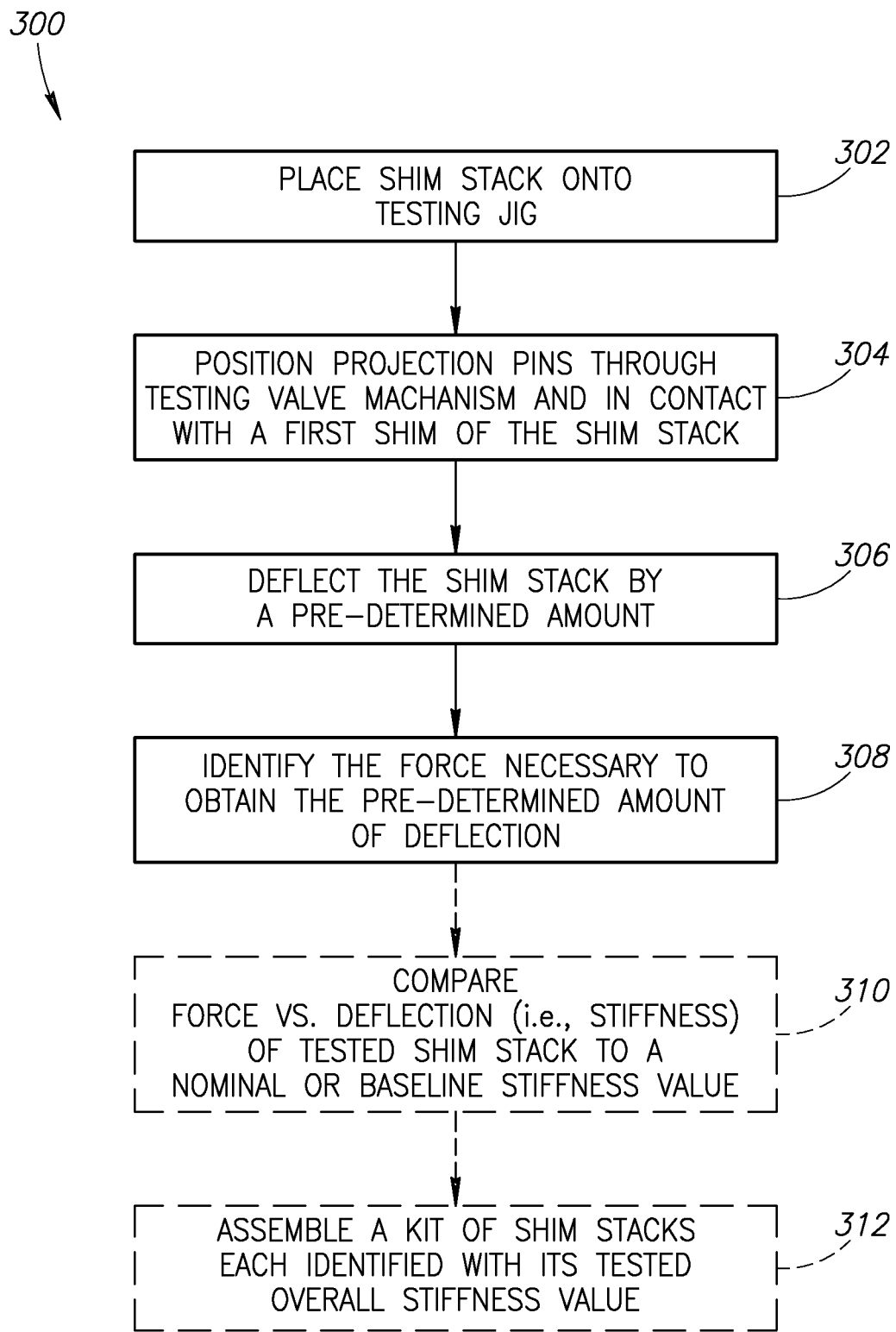
FIG. 3 is a flowchart of a testing method for determining an overall stiffness value of a shim stack according to an embodiment of the present invention.

FIG. 3 shows a flowchart for a method 300 of testing a shim stack using a test jig and testing machine. At step 302, the shim stack is assembled and placed onto the testing jig. As noted above, the shim stack is secured between the testing valve mechanism and the testing piston rod of the jig. At step 304, projection pins from a loading fixture are moved through apertures in the testing valve mechanism into contact with a first shim of the shim stack. At step 306, the projection pins cause the shim stack to be deflected by a pre-determined amount. At step 308, the force necessary to obtain the pre-determined amount of deflection may be identified, displayed and recorded. In short, the necessary force is matched to the pre-determined amount of deflection to obtain an overall stiffness value for the shim stack. At optional step 310, the stiffness value obtained during testing may be compared to a nominal or baseline stiffness value so that an end-user or installer can quickly determine whether the tested shim stack would make the shock absorber softer or firmer. Lastly, at optional step 312, a kit of shim stacks may be assembled in which each stack has an identified stiffness value determined from testing.

While the preferred embodiments of the invention has been illustrated and described, as noted above, many changes can be made without departing from the spirit and scope of the invention. Accordingly, the scope of the invention is not limited by the disclosure of the preferred embodiment. Instead, the invention should be determined by reference to the claims that follow.

The embodiments of the invention in which an exclusive property or privilege is claimed are defined as follows:

1. A shim stack testing apparatus for testing a firmness of a user-selected stack of damping shims for a shock absorber, the apparatus comprising:
   a support configured to maintain the shims in a stacked configuration;
   at least one prong projecting toward a face of the stack of shims and movable relative to the shims to induce a deflection of the stack of shims;
   a transducer for determining at least one of either a force applied by the at least one prong or a deflection induced in the stack of shims by the at least one prong, wherein the force is determined after a pre-determined amount of deflection of the shim stack is achieved or wherein the deflection is determined after a pre-determined amount of force is applied.

2. The shim stack testing apparatus of claim 1, wherein the at least one prong is configured to apply a point load onto the stack.

3. The shim stack testing apparatus of claim 1, wherein the support includes a piston rod with a non-threaded portion and a threaded portion.

4. The shim stack testing apparatus of claim 3, further comprising a member attachable to the support, the member having openings for guiding the at least one prong.

5. The shim stack testing apparatus of claim 1, wherein the stack includes a plurality of shims each having a different outer diameter dimension.

6. A shim stack testing apparatus comprising:
   a base assembly having a base platform and at least two posts extending from the base platform;
   a loading fixture having a plate member coupled to at least two collars arranged on the plate member to collinearly align with and be slidably received by the two posts of the base assembly;
   a plurality of elongated, load-transfer prongs coupled to and extending from the plate member; and
   a shock absorber test assembly having a testing piston rod and a testing valve mechanism, the piston rod coupled to the base platform and configured with a shoulder surface for supporting a shim stack, the testing valve mechanism having corresponding openings to receive the load-transfer prongs,
   wherein the valve mechanism is coupled to the piston rod and oriented so the load-transfer prongs contact and deflect the shim stack.

7. The shim stack testing apparatus of claim 6 wherein the load-transfer prongs are configured to apply point loads onto the shim stack.

8. The shim stack testing apparatus of claim 6, wherein the piston rod includes a non-threaded portion and a threaded portion.

9. The shim stack testing apparatus of claim 8, further comprising a bolt threaded onto the threaded portion of the piston rod to retain the valve mechanism in close contact with the shim stack.

10. The shim stack testing apparatus of claim 6, wherein the shim stack includes a plurality of shims each having a different outer diameter dimension.

11. The shim stack testing apparatus of claim 6, wherein at least one shim of the shim stack includes a thickness that is different than a thickness of an adjacent shim of the shim stack.

12. The shim stack testing apparatus of claim 6, wherein the plurality of elongated, load-transfer prongs coupled to and extending from the plate member include at least three rods arranged equidistant from one another.

13. A method of testing a stiffness of a shim stack, the method comprising:
   positioning a shim stack onto a testing jig;
   moving load-transfer prongs through openings in a valve mechanism such that the rods contactingly engage a first shim of the shim stack;
   applying a force to deflect the shim stack by a pre-determined amount;
   acquiring a value of the force that corresponds to the pre-determined amount of shim stack deflection; and
   recording a stiffness of the shim stack.

14. The method of claim 13, wherein positioning the shim stack includes supporting the shim stack onto a shoulder of a test piston rod.

15. The method of claim 13, wherein moving the load-transfer prongs includes incrementally stepping the rods relative to a test piston supporting the shim stack.

16. A shim stack kit comprising:
   at least two compression shim stacks with each stack having a combination of selected shims, wherein the combination of selected shims were previously tested and identified with a stated overall compression shim stack stiffness; and
   at least two rebound shim stacks having with each stack having a combination of selected shims, wherein the combination of selected shims were previously tested and identified with a stated overall rebound shim stack stiffness,
   wherein the shim stacks were previously tested using a simulated piston-valve test fixture in which the shim stack was deflected by a pre-determined amount to determine a corresponding force.

17. The shim stack kit of claim 16, wherein at least two of the shims of the compression shim stack have different sized outer diameters.

18. The shim stack kit of claim 16, wherein at least two of the shims of the rebound shim stack have different sized outer diameters.

19. The shim stack kit of claim 16, wherein at least two of the shims of the compression shim stack have different thicknesses.

20. The shim stack kit of claim 16, wherein at least two of the shims of the rebound shim stack have different thicknesses.

* * * * *